(12) United States Patent
Lev

(10) Patent No.: US 12,604,062 B2
(45) Date of Patent: Apr. 14, 2026

(54) ENHANCING MEDIA CONSUMPTION EXPERIENCE THROUGH GENERATIVE AI-POWERED INTERACTIVE COMPANIONS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 246 days.

(21) Appl. No.: 18/625,277

(22) Filed: Apr. 3, 2024

(65) Prior Publication Data

US 2025/0317624 A1 Oct. 9, 2025

(51) Int. Cl.
| | |
|---|---|
| *H04N 21/478* | (2011.01) |
| *G06F 40/40* | (2020.01) |
| *H04N 21/442* | (2011.01) |

(52) U.S. Cl.
CPC .......... *H04N 21/478* (2013.01); *G06F 40/40* (2020.01); *H04N 21/44204* (2013.01); *H04N 21/44218* (2013.01)

(58) Field of Classification Search
CPC ........... H04N 21/478; H04N 21/44204; H04N 21/44218; G06F 40/40
See application file for complete search history.

(56) References Cited

U.S. PATENT DOCUMENTS

| | | | | |
|---|---|---|---|---|
| 12,003,821 | B2 * | 6/2024 | Fidaleo .............. | H04N 21/4722 |
| 2019/0057143 | A1 * | 2/2019 | Porter .................. | G06F 16/285 |
| 2022/0157300 | A1 * | 5/2022 | Sharifi .................... | G10L 15/26 |
| 2024/0214633 | A1 * | 6/2024 | Li ...................... | H04N 21/4223 |
| 2025/0165678 | A1 * | 5/2025 | Low ........................ | G06F 30/27 |

* cited by examiner

*Primary Examiner* — Oschta I Montoya

(57) ABSTRACT

System and methods for enhancing the media consumption experience through generative AI-powered interactive companions. The system monitors media content in real-time, detects predefined cues, and generates contextually relevant and emotionally engaging reactions using a generative language model. These reactions are played and/or presented to the user, simulating an interactive conversation. The AI companion may adapt its responses based on user preferences, emotional states, and the context of the media content. By offering personalized interactions, emotional support, and/or contextual relevance, an immersive, engaging, and emotionally satisfying experience for users may be provided. The systems and methods may be used in entertainment, education, therapy, and social domains.

22 Claims, 2 Drawing Sheets

505

Figure 1:
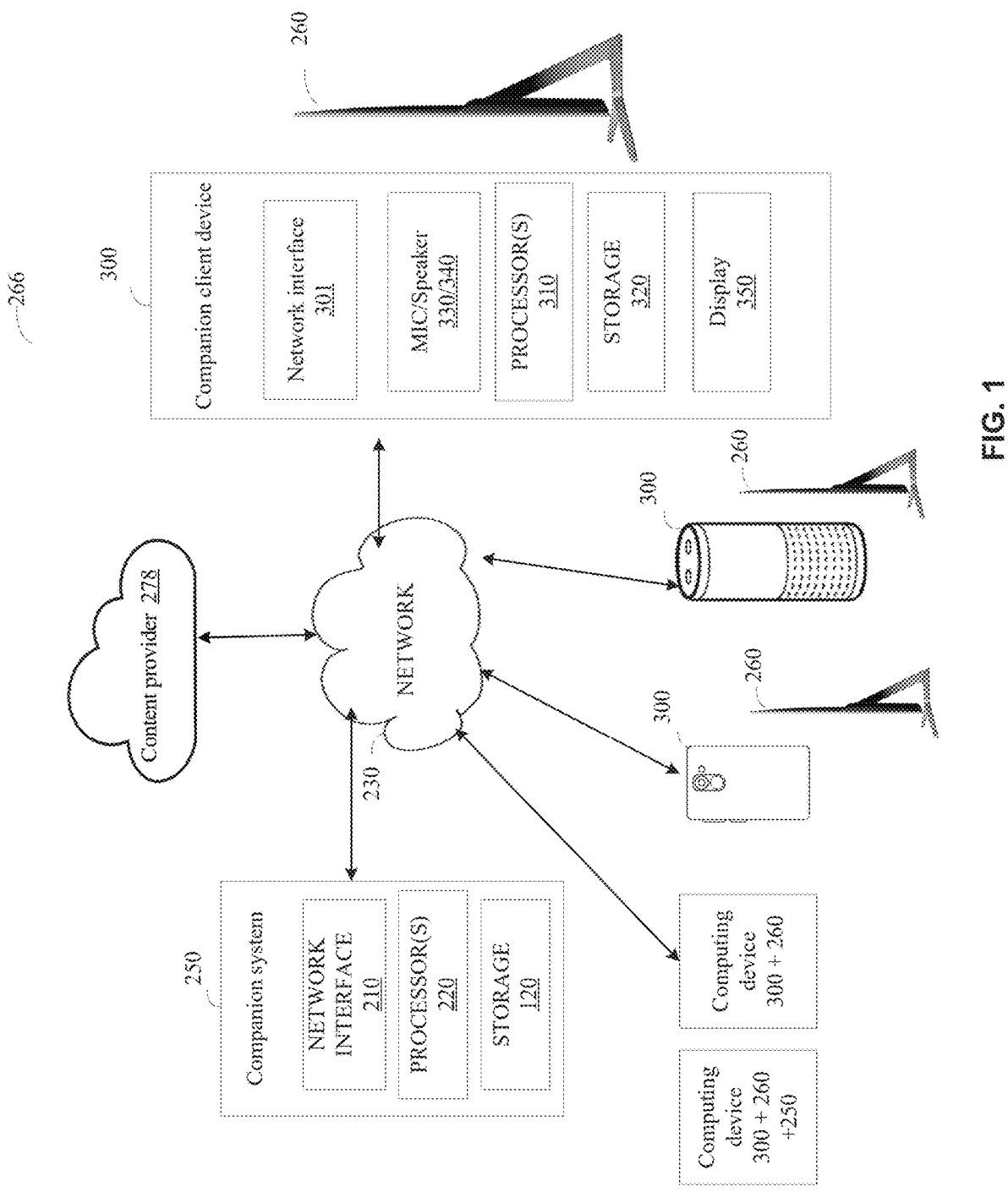

Monitoring media content  presented to a user to detect cue(s)

501

Using data from a time related segment (to the cue) for assembling a prompt

502

Inputting the prompt to a model to generate a synthetic reaction

503

Presenting the synthetic reaction in association with a respective media content

504

ENHANCING MEDIA CONSUMPTION EXPERIENCE THROUGH GENERATIVE AI-POWERED INTERACTIVE COMPANIONS

FIELD AND BACKGROUND OF THE INVENTION

The present invention relates to the field of interactive media consumption and companionship systems. More specifically, the invention pertains to a method and system for enhancing the media consumption experience and alleviating user loneliness through the use of generative artificial intelligence (AI) language models.

In recent years, the rapid advancement of artificial intelligence technology has led to the development of sophisticated language models capable of generating human-like responses to natural language prompts. These models, such as OpenAI's GPT (Generative Pre-trained Transformer) series, have been applied to various domains, including customer support, semantic search, question answering, and education. However, the primary focus of these applications has been on reactive engagement, where the AI model responds to user-initiated prompts.

SUMMARY OF THE INVENTION

According to an aspect of some embodiments of the present invention there are provided systems and methods for Enhancing Media Consumption Experience through generative AI-powered interactive companions and/or alleviating user loneliness through the use of generative AI-powered interactive companions. The system monitors media content presented to a user in real-time, detects predefined cues in segments of the media content, and generates contextually relevant and emotionally engaging reactions using a generative language model trained on a vast corpus of data, including reviews, comments, and forum discussions. The methods involve extracting relevant information from the media content upon detecting a predefined cue, assembling a prompt by combining a predefined prompt template with the extracted content, and providing the assembled prompt to the generative language model to generate a synthetic reaction. The generated reaction is then presented to the user through an interface that facilitates a chat session with an automated chat agent during the media content presentation.

Optionally, the system and/or the method may comprise one or more storage units for storing code and the generative language model, and one or more processors adapted to execute the code to perform the method steps.

Optionally, the system and/or the method analyze textual, audio, and visual cues in the media content, and the predefined cues can be determined based on scripts, transcripts, or similar descriptions of the media content.

Optionally, the system and/or the method allow personalizing the prompt templates and responses based on learned user preferences and emotional states, detecting user reactions to generated synthetic reactions, and using these reactions as input to generate further synthetic reactions.

Optionally, the system and/or the method adjust the timing and content of the synthetic reactions based on the user's physical or mental state and the user's engagement level with the chat session.

Optionally, the system and/or the method can be used for serving multiple users consuming the same media content simultaneously, generating synthetic reactions that promote multi-participant sessions and consider discussions among users. The generated synthetic reactions can be added to a summary for future reference or sharing.

Optionally, the system and/or the method may be integrated with various platforms, such as streaming services, smart TV systems, and voice assistants, to provide a seamless and immersive user experience.

Optionally, the system and/or the method may be applied in various domains, including education, therapy, and social networking, to provide personalized experiences, foster engagement, and support users' well-being.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
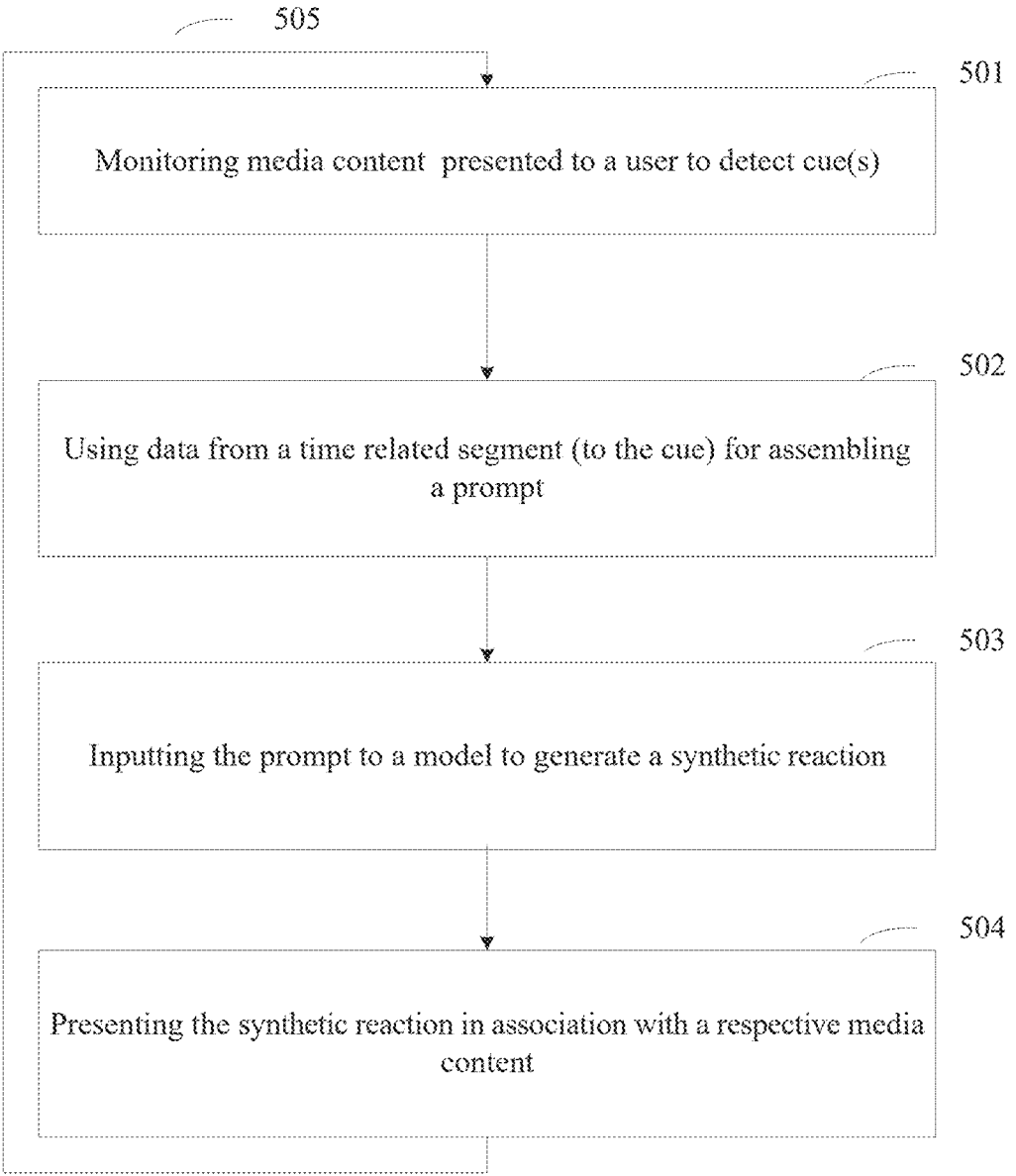

In the drawings:

FIG. 1 illustrates a system for enhancing media consumption experience and preferably alleviating user loneliness, according to some embodiments of the present invention; and FIG. 2 is a flowchart of a method for enhancing media consumption, for instance utilizing the system described with reference to FIG. 1, according to some embodiments of the present invention.

DESCRIPTION OF SPECIFIC EMBODIMENTS OF THE INVENTION

The present invention relates to the field of interactive media consumption and companionship systems. More specifically, the invention pertains to a method and system for enhancing the media consumption experience and alleviating user loneliness through the use of generative artificial intelligence (AI) language models.

While the entertainment industry has made significant strides in delivering high-quality content to consumers through various platforms, such as television, movies, and podcasts, the experience often lacks the element of human companionship. This absence can lead to feelings of loneliness and detachment, particularly for individuals who consume media content alone. Moreover, the passive nature of media consumption does not actively engage the viewer, limiting the potential for intellectual and emotional growth.

Several attempts have been made to address these challenges. For example, virtual assistants like Apple's Siri and Amazon's Alexa have been integrated into smart home devices, providing users with interactive features and companionship. However, these assistants are limited in their ability to engage in context-specific conversations and provide emotional support tailored to the user's media consumption experience.

Another approach has been the development of second-screen applications that provide complementary content and social features during media consumption. These applications aim to enhance viewer engagement and foster a sense of community among users. Nevertheless, they often fail to deliver a truly immersive and personalized experience that addresses the emotional needs of individual users.

Consequently, there is a need for a novel solution that combines the power of generative AI language models with the context of media content to create an interactive, emotionally engaging, and personalized companionship experience. Such a solution would not only enhance the enjoyment of media consumption but also help alleviate feelings of loneliness and provide opportunities for intellectual and emotional growth.

Some embodiments of the present invention addresses these needs by leveraging advanced AI technology to analyze media content in real-time, generate contextually relevant prompts, and engage users in interactive conversations that simulate human companionship. By doing so, the invention aims to transform the media consumption experience, making it more engaging, emotionally supportive, and socially connected.

Some embodiments of the present invention teach systems and methods for enhancing the media consumption experience and alleviating user loneliness through the use of generative AI-powered chat agents. The invention aims to provide users with an interactive, engaging, and emotionally supportive companion during their media consumption journey. The system comprises a generative language model trained on a corpus of conversational data and media-related content, which enables it to generate contextually relevant and emotionally engaging responses. The system monitors the media content in real-time, detecting predefined cues such as specific events, scenes, or emotional triggers. Upon detecting a cue, the system extracts relevant information and generates a synthetic reaction using the generative language model.

The generated synthetic reactions are optionally played to the user for instance using a speaker, simulating a conversational experience with a person. The reactions can be in the form of text, voice, or other output modalities, and they are designed to be contextually appropriate, emotionally resonant, and aligned with the user's preferences and emotional states.

The system offers several key benefits:

Enhanced Engagement: The AI-powered chat agent actively engages users during their media consumption, providing an interactive and immersive experience. Users can participate in conversations, share their thoughts and emotions, and receive relevant and engaging responses.

Emotional Support: The chat agent offers emotional support and companionship to users, helping to alleviate feelings of loneliness and isolation. The generated reactions are designed to be empathetic, understanding, and emotionally attuned to the user's needs.

Personalization: The system learns from user interactions and adapts its responses to individual preferences, communication styles, and emotional states. This personalization creates a tailored and meaningful experience for each user.

Contextual Relevance: The reactions are grounded in the context of the media content, incorporating references to characters, events, and themes. This contextual integration enhances the user's immersion and connection to the media.

Increased Retention and Satisfaction: By providing an engaging and emotionally supportive companion, the system encourages users to stay invested in the media content. The interactive experience increases user satisfaction and fosters a deeper appreciation for the media.

Scalability and Accessibility: The system may leverage cloud computing, containerization, and virtualization technologies to ensure scalability and accessibility. Users may access the service from various devices and locations, enjoying a consistent and reliable experience.

The invention represents a significant advancement in the field of media consumption and AI-driven companionship. By combining the power of generative language models with media analysis, the system offers a transformative and emotionally enriching experience for users. The potential applications of this invention may extend beyond entertainment, as it can be adapted for educational, therapeutic, and social purposes. The AI-powered chat agent may provide guidance, support, and companionship in various contexts, making it a versatile and valuable tool for enhancing human experiences and well-being.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a system (250) for enhancing media consumption experience and preferably alleviating user loneliness, according to some embodiments of the present invention. The system (250) comprises one or more storage units (120) and one or more processors (220). The one or more storage units (120) are configured to store a code and a generative language model. The code comprises a set of instructions executable by the one or more processors (220) to perform various functions, as described herein. The generative language model is a pre-trained AI model capable of generating contextually appropriate and emotionally engaging responses to given prompts.

The one or more processors (220) are adapted to execute the code stored in the one or more storage units (120). Upon execution of the code, the one or more processors (220) are configured to monitor media content presented to a user in real-time or in advance on a presentation device (260) such as a screen or a projector. The media content may include, but is not limited to, television shows, movies, podcasts, or any other form of audio-visual content. The presentation device (260) may be managed by a third party which is not managed by the same entity as the system (250), for instance a streaming service. The content displayed on the presentation device (260) may be managed by the same entity as the system (250). The monitoring process involves analyzing the media content to detect at least one predefined cue in a segment of the media content. The analysis may be performed in advance or in real time as described below. The predefined cue may be a specific event, dialogue, or scene that triggers the generation of a synthetic reaction. The media content may be directly acquired from a content provider server (278), such as a streaming service or a file storage.

Optionally, the monitoring of the media content involves analyzing its textual content. This textual analysis is performed by the one or more processors (220) executing the code stored in the one or more storage units (120). The textual content of the media can include various forms of written information, such as:

Subtitles or closed captions: Many media content items, especially videos, include subtitles or closed captions that provide a written transcription of the spoken dialogue, narration, or audio cues. The system (250) can extract and analyze these subtitles or closed captions to understand the content of the media and identify relevant cues or moments for generating synthetic reactions.

Metadata or tags: Media content items often come with metadata or tags that provide additional information about the content, such as the title, description, genre, characters, or key themes. The system (250) can parse and analyze this metadata to gain insights into the context and subject matter of the media content, helping to inform the generation of appropriate synthetic reactions.

Scripts or transcripts: In some cases, the media content may have an associated script or transcript that provides a detailed written record of the dialogue, actions, and scene descriptions. The system (250) can process and analyze these scripts or transcripts to identify important plot points, character interactions, or emotional moments that warrant a synthetic reaction.

By analyzing the textual content of the media, the system (250) can detect matches between cues and segments of the content such as scenes, based on predefined narrative, themes, and/or emotional arcs in these segments. The one or more processors (220) can apply natural language processing (NLP) techniques, such as sentiment analysis, keyword extraction, or named entity recognition, to extract meaningful information from a text or metadata representing the content. This information can then be used to identify relevant cues in the content the user watches, generate appropriate prompts, and generate contextually appropriate synthetic reactions accordingly. The analysis provides a comprehensive understanding of the content and enabling more accurate and relevant synthetic reactions.

Additionally or alternatively, the predefined cues may be detected by analyzing audio content of the media being consumed by the user to detect predefined cues. The one or more processors (220) are adapted to execute specialized code modules stored in the one or more storage units (120) to perform this audio analysis. The audio analysis of the system (250) may employ signal processing techniques and/or machine learning algorithms to examine various aspects of the audio content, such as tone, pitch, intensity, and emotion. These techniques may include:

1. Tone Analysis: The system (250) utilizes tone recognition algorithms to identify specific tonal patterns or variations in the audio content. It can detect changes in the overall tone of the audio, such as shifts from a neutral tone to a more excited, suspenseful, or somber tone. These tonal changes can serve as predefined cues for generating synthetic reactions.
2. Pitch Analysis: The audio analysis module includes pitch detection algorithms that can identify and track the pitch of the audio content. It can recognize significant changes in pitch, such as a sudden increase or decrease in the frequency of the audio signal. These pitch variations can indicate important moments or emotional shifts in the media content and act as predefined cues.
3. Intensity Analysis: The system (250) employs intensity or volume analysis techniques to measure the loudness or energy levels of the audio content. It can detect sudden spikes or drops in intensity, which may correspond to key events, dramatic moments, or emotional outbursts in the media. These intensity changes serve as predefined cues for generating relevant synthetic reactions.
4. Emotion Analysis: The audio analysis module incorporates emotion recognition algorithms that can identify and classify the emotional content of the audio. It can detect specific emotions, such as happiness, sadness, anger, fear, or surprise, based on the acoustic features and patterns present in the audio signal. These detected emotions can act as predefined cues, triggering appropriate synthetic reactions to enhance the user's emotional engagement.

By analyzing the audio content across these different dimensions, the system (250) can detect a wide range of predefined cues that are indicative of significant moments, emotional shifts, or key events in the media content. The detected cues serve as triggers for generating contextually relevant and emotionally resonant synthetic reactions. The audio analysis may process audio content in real-time as the user consumes the media.

Additionally or alternatively, the predefined cues may be detected by analyzing video content of the media being consumed by the user to detect predefined cues. The cue detection may be enhanced to include computer vision techniques that enable the system to analyze and interpret visual information from the media content. Some examples of visual cues that can be detected include:

1. Facial expressions: The system may employ facial recognition and emotion detection algorithms to identify the facial expressions of characters in the media content. By analyzing the emotions conveyed through facial expressions, such as happiness, sadness, anger, or surprise, the system can gain valuable insights into the emotional state of the characters and the overall tone of the scene. This information can be used to generate synthetic reactions that are emotionally aligned with the visual cues.
2. Scene changes and transitions: The cue detection may identify significant scene changes and transitions in the media content. This can include detecting cuts, fades, or dissolves between scenes, which often indicate a change in narrative focus or emotional tone. By recognizing these visual transitions, the system can generate appropriate reactions or prompts that reflect the shift in the story or atmosphere.

3. Visual objects and symbols: The system can be trained to recognize and interpret visual objects, symbols, or icons that appear in the media content. For example, the presence of certain objects (e.g., a gun, a wedding ring) or symbols (e.g., a stormy sky, a broken mirror) can convey specific meanings or emotional undertones. By detecting and analyzing these visual elements, the system can generate reactions that take into account the symbolic or metaphorical significance of the visuals.

4. Character movements and actions: The cue detection module can analyze the movements and actions of characters in the media content. This can include detecting gestures, body language, or physical interactions between characters. By understanding the non-verbal cues conveyed through character movements, the system can generate reactions that are more attuned to the emotional dynamics and interpersonal relationships within the story.

5. Visual aesthetics and style: The system can be designed to analyze the overall visual aesthetics and style of the media content. This can include detecting color palettes, lighting, camera angles, or cinematographic techniques used in the visuals. By understanding the artistic choices and visual mood of the content, the system can generate reactions that are more visually evocative and aligned with the intended emotional impact of the media.

The visual cue detection may be integrated with the existing audio and textual cue detection processes to provide a more holistic understanding of the media content or used independently. By combining insights from multiple modalities, the system may generate synthetic reactions that are more contextually relevant, emotionally nuanced, and aligned with the overall narrative and aesthetic experience of the media.

When a predefined cue is detected, the system (250) extracts the relevant information from the matching audio and/or video signal and passes it to the other components of the system, such as the prompt generation and synthetic reaction generation, to create an appropriate response as described below. The ability to analyze audio content and detect predefined cues based on tone, pitch, intensity, and emotion enables the system (250) to provide a more immersive and emotionally engaging experience for the user. It allows the system (250) to respond to the subtle nuances and emotional undertones present in the media content, creating a more naturalistic and empathetic interaction between the user and an automated chat agent.

In response to detecting the at least one predefined cue, the one or more processors (220) extract relevant information from the segment of the media content containing the detected cue. The extracted information may include, but is not limited to, dialogue text, scene descriptions, or character information.

The one or more processors (220) then assemble a prompt by combining a prompt template predefined for the detected cue with the extracted content from the media segment. The prompt template is a pre-designed structure that provides context and guidance for generating a relevant and engaging response. By incorporating the extracted content into the prompt template, the system (250) creates a personalized and context-specific prompt.

The assembled prompt is then provided to the generative language model stored in the one or more storage units (120). The generative language model processes the prompt and generates a synthetic reaction to the extracted content. The synthetic reaction is designed to be contextually appropriate and emotionally engaging, simulating a human-like response to the events or dialogue in the media content.

Finally, the one or more processors (220) instruct the presentation of the generated synthetic reaction to the user via an interface. Instructions for the presentation may be sent via a network interface (210). The interface facilitates a chat session between the user and at least one automated chat agent during the presentation of the media content. The chat agent may be a virtual character or avatar that represents the system (250) and engages in interactive conversation with the user. The presentation of the synthetic reaction may be in the form of text, audio, or a combination thereof, depending on the user's preferences and the capabilities of the interface.

By repeatedly monitoring the media content, extracting relevant information, assembling prompts, generating synthetic reactions, and presenting them to the user in real-time, the system (250) creates an interactive and emotionally engaging experience that enhances media consumption and alleviates user loneliness. The system (250) provides a sense of companionship and fosters a more immersive and personalized media consumption experience.

In addition to the system (250), to implement the interface with the user, a companion client device (300) may be used to facilitate the presentation of synthetic reactions and the acquisition of user reactions to the presented content. The companion client device (300) serves as a user-friendly interface between the user and the system (250), enabling seamless interaction and enhancing the overall media consumption experience.

The companion client device (300) comprises a processor (310), a storage unit (320), and a man machine interface such as a speaker (330) and a microphone (340). The processor (310) is a central processing unit (CPU) or any other suitable processing device capable of executing instructions and performing computations. The storage unit (320) is a memory device, such as RAM, ROM, or a combination thereof, that stores the necessary software components, data, and user preferences required for the functioning of the companion client device (300).

The companion client device (300) may be an application implemented on the device used to display the presented content and/or an independent device provided in proximity to the user. For example, the companion client device (300) may be a tablet or a laptop or a smartphone, such as an iPhone or an Android device, executing an application. The companion client software can be developed as an application such as a mobile app that the user can download and install on their smartphone. The app can communicate with the system (250) through a wireless network connection, such as Wi-Fi or cellular data. The companion client device (300) may be a smart speaker, such as Amazon Echo or Google Home. The companion client software can be integrated into the smart speaker's existing software ecosystem, allowing the user to interact with the system (250) using voice commands or provided as part of a designated device.

The companion client device (300) may be a smart TV or Set-Top Box, such as Apple TV or Roku, that executes a companion client software. These devices are connected to a television and offer a range of streaming services and apps. The companion client device (300) may be a wearable device executing a suitable software. These devices are equipped with small speakers, microphones, and displays that can provide audio and visual feedback to the user as described herein. The companion client software can be developed as a wearable app that communicates with the system (250) through a wireless network connection, such as Bluetooth or Wi-Fi.

Optionally, the companion client device (300) communicates with the system (250) through a communication network (301), such as the Internet or a local area network (LAN). The processor (310) executes software components stored in the storage unit (320) to establish a connection with the system (250) and exchange data, including the synthetic reactions and user reactions.

When the system (250) generates a synthetic reaction, it sends the reaction to the companion client device (300) over the communication network. The processor (310) of the companion client device (300) receives the synthetic reaction and processes it to determine the appropriate output format. If the synthetic reaction is in the form of text, the processor (310) may utilize a text-to-speech (TTS) engine to convert the text into an audio format suitable for playback through the speaker (330). The TTS engine may be a software component stored in the storage unit (320) or a cloud-based service accessed through the communication network.

Once the synthetic reaction is in an audio format, the processor (310) sends the audio data to the speaker (330) for playback. The user listens to the synthetic reaction through the speaker (330) and can provide their own reaction, comment, or question in response. The user's speech is captured by the microphone (340), which converts the sound waves into electrical signals.

The processor (310) receives the electrical signals from the microphone (340) and processes them using speech recognition algorithms or software components stored in the storage unit (320). The speech recognition process converts the user's speech into text or a structured data format suitable for transmission to the system (250). The processed user reaction is then sent back to the system (250) over the communication network for further analysis and generation of subsequent synthetic reactions.

The companion client device (300) may also include a display screen (350) to provide visual feedback or complementary information related to the media content or the synthetic reactions. The display screen (350) can display text, images, or video content that enhances the user's understanding and engagement with the presented content.

Furthermore, the companion client device (300) may include user input devices, such as buttons, touchscreens, or gesture recognition sensors, to allow the user to control the playback of media content, adjust settings, or provide non-verbal feedback to the system (250).

By incorporating a companion client device (300) with a processor (310), storage unit (320), speaker (330), and microphone (340), the media consumption experience becomes more interactive and personalized. The user can engage in natural conversations with the automated chat agent, receive contextually relevant and emotionally engaging reactions, and provide their own responses and feedback in real-time. This enhances the overall immersion and enjoyment of the media content while alleviating feelings of loneliness and isolation.

The system (250) may be deployed and executed on a cloud computing platform, such as Amazon Web Services (AWS), Microsoft Azure, or Google Cloud Platform (GCP). The system (250) may also be containerized using dockers, which provides an isolated and portable execution environment for the various components of the system. The system (250) may be deployed and executed on virtual machines (VMs), which provide an abstraction layer over the physical hardware. While the above description focuses on a server/cloud service-client scenario, other implementation may be used, for example an execution of the system (250) functions locally by the companion client device (300). In such an implementation, the model is locally installed at the storage of the companion client device (300).

System (250) may be incorporated into one or more existing media consumption environments, such as a streaming platform. The system (250) may be integrated into these platforms through APIs (Application Programming Interfaces) or dedicated plugins. This integration allows the companion to directly access the media content being streamed, enabling real-time analysis, cue detection, and generation of contextually relevant reactions.

For example, the system (250) may be integrated as a feature within the streaming platform's user interface. As the user watches a movie or TV show on the platform, the companion may appear as an overlay or a sidebar, providing interactive prompts, reactions, and engaging content related to the media being consumed. The integration ensures a seamless and uninterrupted viewing experience while enhancing the user's engagement and emotional connection with the content.

Another avenue for integration is through smart TV systems or connected TV devices. Many smart TVs and streaming devices, such as Apple TV, Roku, or Amazon Fire TV, offer app ecosystems and developer tools that allow third-party applications to be integrated into their platforms. The AI companion system may be developed as a standalone app or a companion app that may be installed on these devices.

By integrating with smart TV systems, the invention may leverage the device's capabilities, such as voice control, gesture recognition, or screen mirroring, to provide an immersive and interactive experience. Users may interact with the AI companion using voice commands, control the companion's reactions through gestures, or display additional content related to the media on the TV screen.

In addition to streaming services and smart TV systems, the invention may also be integrated with voice assistants like Amazon Alexa, Google Assistant, or Apple's Siri. These voice assistants are increasingly being used as control centers for media consumption, allowing users to search for content, control playback, and access related information using voice commands.

By integrating the AI companion system with voice assistants, users may engage with the companion naturally through voice interactions. For instance, while watching a movie, the user may ask the voice assistant to activate the AI companion, ask for explanations about a specific scene, or request recommendations for similar content. The integration with voice assistants makes the interaction with the AI companion more intuitive and accessible, enhancing the overall user experience.

Furthermore, the invention may be integrated with social media platforms or fan communities dedicated to specific media franchises or genres. These platforms often serve as hubs for fan discussions, theories, and content sharing. By integrating the AI companion into these platforms, users may engage in interactive discussions with the companion and other fans, share their reactions and insights, and access exclusive content or experiences related to their favorite media.

The integration with social media and fan communities fosters a sense of belonging and shared passion among users, enhancing the social aspect of media consumption. The AI companion may act as a facilitator, moderator, or content curator within these communities, driving engagement and providing personalized experiences based on the user's interests and interactions.

Reference is now also made to FIG. 2 which is a flowchart of a method for enhancing media consumption, for instance utilizing the system (250) described with reference to FIG. 1, according to some embodiments of the present invention. The method comprises several steps, each of which is performed by the one or more processors (220) executing the code stored in the one or more storage units (120).

First, as shown at 501, the media content presented to the user in real-time is identified and monitored. For instance, the one or more processors (220) analyze the audio, visual, and/or textual data of the media content to detect at least one predefined cue in a segment of the media content. The audio, visual, and/or textual data may be scripts of the presented content as described below.

The system (250) may identify which media content is presented using a sensor that is located in proximity to the device presenting the content (260). The sensor may be of the client device (300). The identification may be performed by audio and/or video signal matching processes. For instance, a segment of the media content is captured, for instance 5-20 seconds of a sound or image and analyzed to identify a fingerprint of the recorded sample. This fingerprint is matched with database records to identify the played media and a present timestamp, identifying exactly which media is played and what is the currently played part. A fingerprint may be extracted from audio and/or video signal. Different methods for video or audio fingerprinting may be used, methods which are relied on changes in patterns of image intensity over successive video frames, see for example Oostveen, J., Haitsma, J., Kalker, T. (2004). Algorithms for Audio and Video Fingerprinting. In: Verhaegh, W. F. J., Aarts, E., Korst, J. (eds) Algorithms in Ambient Intelligence. Philips Research, vol 2. Springer, Dordrecht. https://doi(dot)org/10.1007/978-94-017-0703-9_11.

The system (250) may identify which media content is presented using an API and/or a software module having network connection with the content provider (278). The system (250) may identify which media content is presented using an API and/or a software module having network connection with the device presenting the content (260).

Monitoring may be performed by continuous or intermediate signal capturing and/or by monitoring the time since the content identification event during which played media and in content playing time were identified from analysis of a signal originated from the device presenting the content (260) or in any other manner.

The predefined cues may be stored in the one or more storage units (120) as a set of rules, patterns, or templates that the system (250) is trained to recognize. These cues can include specific dialogue phrases, scene changes, character actions, or any other identifiable markers within the media content.

Upon detecting at least one predefined cue, the one or more processors (220) proceed to extract relevant information from the segment of the media content containing or related to the detected cue. The extracted information may include, but is not limited to, transcribed dialogue, scene descriptions, character names, or any other contextual data that can be used to generate a meaningful and contextually appropriate response. The extraction process may involve techniques such as natural language processing (NLP), optical character recognition (OCR), or audio analysis, depending on the nature of the media content and the type of cue detected.

As shown at 502, once the relevant information has been extracted, the one or more processors (220) assemble a prompt by combining a prompt template predefined for the detected cue with the extracted content from the media segment. The prompt templates are stored in the one or more storage units (120) and are designed to provide a structured format for generating coherent and contextually relevant responses. Each prompt template corresponds to a specific type of cue and includes placeholders for inserting the extracted information. By combining the prompt template with the extracted content, the system (250) creates a personalized prompt that captures the essence of the detected cue and the relevant context from the media content.

As shown at 503, the assembled prompt is then provided as input to the generative language model stored in the one or more storage units (120). The generative language model, which is pre-trained on a large corpus of text data, uses advanced machine learning techniques, such as transformer architectures or recurrent neural networks (RNNs), to generate a synthetic reaction to the extracted content. The training process of the generative language model involves exposing it to a diverse range of texts, including dialogues, narratives, and emotional expressions, to enable it to produce contextually appropriate and emotionally engaging responses. The generated synthetic reaction aims to simulate a human-like response to the detected cue and the extracted information, taking into account the emotional tone, the characters involved, and the overall context of the media content.

Optionally, the above described training is based on reviews, comments, and/or forum discussions about a plurality of media content items. The reviews, comments, and/or forum discussions provide valuable insights into how real users perceive, interpret, and react to different media content items. By incorporating this data into the training process, the generative language model can learn to mimic the language, tone, and emotional expressiveness of human responses to media content. The training data can be sourced from various online platforms, such as:

1. Review websites: Websites like IMDb, Rotten Tomatoes, or Goodreads contain a wealth of user-generated reviews and ratings for movies, TV shows, and books. These reviews often include detailed opinions, analysis, and emotional reactions to the content.

2. Social media platforms: Social media platforms like Twitter, Facebook, or Reddit host a vast amount of user-generated content related to media, including comments, discussions, and fan reactions. These platforms provide a rich source of data for understanding how users engage with and respond to different media content items.

3. Fan forums and discussion boards: Dedicated fan forums and discussion boards for specific movies, TV shows, or franchises contain in-depth conversations, theories, and emotional responses from passionate fans. These discussions can provide valuable insights into the nuances and emotional resonance of the media content.

The training data is preprocessed and fed into the generative language model by the one or more processors (220) using machine learning frameworks and algorithms stored in the one or more storage units (120). Instead, or in addition, a designated training hardware may be used. The model is trained to generate responses that capture the language patterns, emotional expressions, and contextual relevance found in the training data. By training the generative language model on reviews, comments, and forum discussions, the system (250) can generate synthetic reactions that are more human-like, emotionally resonant, and contextually appropriate. The model learns to understand and express the wide range of emotions, opinions, and reactions that real users have towards media content, allowing it to provide more engaging and empathetic responses to the user during their media consumption experience. Furthermore, the training data can be continually updated and expanded over time as new media content is released and new user-generated content becomes available. This ongoing training process ensures that the generative language model stays up-to-date with the latest trends, opinions, and emotional responses related to media content, enabling it to generate relevant and timely synthetic reactions.

The training of the generative language model may involve exposing the model to a vast corpus of conversational data, media-related content, and user interactions to learn the patterns, styles, and emotional nuances of human communication. One of the key techniques used in training the generative language model is transfer learning. The model is first pre-trained on a large-scale, general-purpose language corpus, such as books, articles, and websites, to acquire a broad understanding of language structure, grammar, and semantics. This pre-training allows the model to learn fundamental linguistic knowledge that can be transferred and adapted to the specific domain of media-related conversations. After the initial pre-training, the model undergoes fine-tuning using a more targeted dataset relevant to the invention's application. This dataset includes a diverse range of media-related content, such as movie and TV show scripts, plot summaries, character descriptions, and user reviews. By exposing the model to this domain-specific data, it learns to understand and generate responses that are contextually relevant to the media content being consumed.

To further enhance the emotional engagement of the generated responses, the model may be trained on a dataset of emotional dialogues and expressions. This dataset includes examples of conversations that convey various emotions, such as happiness, sadness, excitement, and empathy. By learning from these emotional dialogues, the model develops the ability to generate responses that are emotionally resonant and aligned with the user's emotional state.

In addition to the content-based training, the generative language model may also be trained on user interaction data. This includes chat histories, user preferences, and feedback from previous interactions with the system. By learning from these user-specific data points, the model can adapt its responses to individual user preferences and communication styles, enabling a more personalized and engaging conversation experience.

The training process may utilize deep learning architectures, such as Transformer models (e.g., GPT, BERT). These architectures allow the model to capture long-range dependencies, context-awareness, and coherence in the generated responses. During training, the model may be optimized using objectives such as maximum likelihood estimation (MLE) or reinforcement learning (RL). The training data may be continually updated and expanded as new media content becomes available and user interactions accumulate. This ongoing training process ensures that the generative language model stays up-to-date with the latest trends, styles, and user preferences, enabling it to provide relevant and engaging responses over time.

Finally, as shown at 504, the generated synthetic reaction is presented to the user through an interface that facilitates a chat session between the user and at least one automated chat agent. The presentation is optionally performed in time association with the detected cue. The interface may be a dedicated application, a web-based platform, or an integrated feature within the media playback environment such as the above described companion client device 270. The one or more processors (220) send instructions to the interface to play the synthetic reaction as a voice remark from the automated chat agent. The chat agent may be represented by a virtual character that engages in a conversational exchange with the user. The user can respond to the synthetic reaction, ask questions, or provide feedback, which the system (250) can process and use to generate further responses or adjust future reactions for example as further described below.

Optionally, the generated synthetic reaction is presented in a voice that emulates a character, such as a character from the media content being consumed by the user. Optionally, the processors of the system (250) execute a voice emulation code that can generate speech in the style of specific characters from the media content. This voice emulation code may implement speech synthesis technique(s), such as deep learning-based text-to-speech models or voice cloning algorithms, which are stored in the one or more storage units (120). When a synthetic reaction is generated, the one or more processors (220) analyze the content of the reaction and determine if it is associated with a specific character from the media content. This determination can be based on various factors, such as the context of the reaction, the dialogue it is responding to, or the presence of character-specific keywords or phrases. If a character is identified, the one or more processors (220) invoke the voice emulation to generate the audio representation of the synthetic reaction using the voice of that character. The voice emulation takes into account the character's unique vocal characteristics, such as pitch, intonation, accent, and speaking style, to create a convincing and authentic-sounding voice.

The generated audio is then presented to the user through the speaker (330) of the companion client device (300). The user experiences the synthetic reaction as if it is being spoken by the actual character from the media content, enhancing the immersion and engagement of the chat session.

By using voice emulation, the system (250) creates a more seamless and believable interaction between the user and the automated chat agent. It adds an extra layer of realism and familiarity to the chat session, making the user feel more connected to the characters and the media content itself.

Optionally, the timing or content of the generated synthetic reactions is adjusted based on the user's physical or mental state. The system (250) utilizes various sensors and input devices integrated into the companion client device (300) to gather data about the user's physical and mental state. These sensors may include cameras, microphones, wearable devices, or other specialized sensors that can monitor the user's facial expressions, body language, voice tone, heart rate, or other physiological indicators.

The one or more processors (220) analyze the collected data using machine learning algorithms or pre-defined rules to infer the user's physical or mental state. For example, the system (250) may detect if the user is experiencing emotions such as happiness, sadness, anger, or frustration based on their facial expressions or voice tone. It may also identify signs of fatigue, distraction, or engagement based on the user's body language or physiological data.

Based on the determined physical or mental state, the system (250) adapts the timing or content of the generated synthetic reactions to better suit the user's current condition. For instance, if the user appears tired or disengaged, the system (250) may reduce the frequency of synthetic reactions or generate reactions that are more concise and to the point. On the other hand, if the user seems excited or highly engaged, the system (250) may increase the frequency and enthusiasm of the synthetic reactions to match the user's energy level.

Moreover, the content of the synthetic reactions can be tailored to address the user's specific physical or mental state. If the user is detected to be stressed or anxious, the system (250) may generate reactions that offer reassurance, provide relaxation techniques, or suggest taking a break. If the user appears confused or frustrated, the system (250) may generate reactions that provide clarification, offer guidance, or suggest alternative approaches to understanding the media content.

By adjusting the timing and content of the synthetic reactions based on the user's physical or mental state, the system (250) provides a more personalized and attentive experience. It demonstrates the system's (250) ability to adapt to the user's needs in real-time, offering support, guidance, and engagement that is tailored to their current condition.

Optionally, the synthetic reactions are generated in accordance with an objective set for the chat session. Optionally, the code executed by the system (250) defines a set of possible objectives that the chat session can aim to achieve. These objectives are related to various aspects of the user's experience and well-being, such as reducing user loneliness, assessing the user's mental state, or educating the user about specific topics or concepts related to the media content.

At the beginning of the chat session or at periodic intervals, the one or more processors (220) analyze the user's interactions, responses, and behavior to determine the most relevant objective for the current session. This determination can be based on various factors, such as the user's initial input, their engagement level, the type of media content being consumed, or the user's previous chat history.

For example, if the user expresses feelings of loneliness or isolation, the system (250) may set the objective of the chat session to reduce user loneliness. In this case, the generated synthetic reactions will focus on providing companionship, emotional support, and fostering a sense of connection with the user. The reactions may include empathetic responses, encouragement, or prompts for further conversation to help alleviate the user's loneliness.

If the system (250) detects signs of mental distress or unusual behavior in the user's interactions, it may set the objective to assess the user's mental state. The generated synthetic reactions will be designed to gather more information about the user's thoughts, feelings, and well-being. The reactions may include open-ended questions, reflective statements, or gentle probes to encourage the user to express themselves and provide insights into their mental state.

If the user expresses curiosity or confusion about certain aspects of the media content, the system (250) may set the objective to educate the user. The generated synthetic reactions will focus on providing explanations, background information, or relevant trivia to enhance the user's understanding and appreciation of the media content. The reactions may include interesting facts, character analyses, or thematic discussions to enrich the user's learning experience.

Once the objective is determined, the one or more processors (220) generate synthetic reactions that align with that objective. The content, tone, and style of the reactions are adapted to effectively achieve the desired outcome, whether it is reducing loneliness, assessing mental state, or educating the user.

Throughout the chat session, the system (250) may continuously monitor the user's responses and engagement to evaluate the effectiveness of the generated reactions in meeting the determined objective. If necessary, the system (250) can adjust the objective or refine the reaction generation process to better serve the user's needs.

Optionally, as shown at 505 the process is repeated. By continuously repeating this process throughout the media consumption experience, the method creates an interactive and engaging companion that reacts to the content in real-time, providing contextually relevant and emotionally resonant responses. This enhances the overall media consumption experience, making it more immersive, personalized, and socially engaging, thereby alleviating feelings of loneliness and fostering a deeper connection between the user and the media content. The user receives a stream of contextually relevant and emotionally supportive reactions, simulating the presence of a knowledgeable and empathetic companion. This repetition helps maintain user engagement, reduces feelings of loneliness, and enhances the overall enjoyment of the media content.

The repetition of the monitoring, assembling, providing, and presenting steps also allows for a more granular and personalized experience. As the system (250) processes more cues and generates more synthetic reactions, it can learn from the user's responses and adjust its behavior accordingly. This may involve adapting the prompt templates, refining the generative language model, or modifying the timing and frequency of the synthetic reactions based on user preferences or engagement levels.

Furthermore, the repetition of these steps enables the system (250) to build a comprehensive understanding of the media content and the user's preferences over time. This accumulated knowledge can be used to provide more accurate and relevant synthetic reactions, anticipate user needs, and offer personalized recommendations for additional media content or related experiences.

Optionally, a frequency of generating and presenting synthetic reactions is adjusted based on User Engagement Level. For example, the system (250) may monitor the user's interaction with the chat session through the companion client device (300). The one or more processors (220) analyze various indicators of user engagement, such as:

1. Response time: The system (250) may measure the time it takes for the user to respond to the generated synthetic reactions. Faster response times generally indicate higher engagement levels.

2. Interaction frequency: The system (250) may track how often the user interacts with the chat session, either by providing verbal responses, typing messages, or using other input methods. Higher interaction frequency suggests higher engagement.

3. Sentiment analysis: The system (250) may analyze the sentiment and emotion expressed in the user's responses using natural language processing techniques. Positive sentiment and enthusiastic responses indicate higher engagement, while neutral or negative sentiment may suggest lower engagement.

4. Attention tracking: optionally the companion client device (300) is equipped with cameras or other sensors, so as to allow the system (250) to track the user's attention, such as eye gaze or body language, to determine their level of engagement with the chat session.

Based on the analysis of these engagement indicators, the one or more processors (220) determine the user's engagement level. If the engagement level is high, indicating that the user is actively participating and interested in the chat session, the system (250) increases the frequency of presenting the generated synthetic reactions. This means that the system (250) generates and presents synthetic reactions more frequently, keeping the user engaged and maintaining the momentum of the conversation.

On the other hand, if the user's engagement level is low, suggesting that the user is less interested or distracted, the system (250) decreases the frequency of presenting the generated synthetic reactions. The system (250) may generate and present synthetic reactions less frequently, allowing the user more time to process the content or reengage with the chat session at their own pace.

By adjusting the frequency of presenting synthetic reactions based on the user's engagement level, the system (250) adapts to the user's needs and preferences. It helps maintain a balance between keeping the user engaged and not overwhelming them with excessive reactions. This adaptive approach enhances the user's overall experience with the chat session and the media consumption process.

Optionally, as generally described above, the described method may be further enhanced by detecting the user's reaction to the generated synthetic reaction and using that reaction as input to another generative language model to generate a further synthetic reaction. This process creates a more interactive and engaging conversation between the user and the automated chat agent.

After presenting the initial synthetic reaction to the user through the companion client device (300), the system (250) monitors the user's response using the microphone (340) or other input devices. The user's reaction can be in the form of spoken words, gestures, facial expressions, or other forms of feedback captured by the companion client device (300).

The captured user reaction is then processed by the one or more processors (220) to extract relevant information. This processing may involve speech recognition to convert spoken words into text, sentiment analysis to determine the emotional tone of the user's response, or other techniques to interpret the user's feedback.

The extracted information is then used as input to another generative language model, which may be specifically trained to generate follow-up reactions based on user feedback. This secondary generative language model is stored in the one or more storage units (120) and is designed to create contextually appropriate and emotionally engaging responses that build upon the user's reaction.

The one or more processors (220) feed the user's reaction into the secondary generative language model, which generates a further synthetic reaction. This further reaction takes into account the user's feedback, the context of the previous synthetic reaction, and the overall flow of the conversation. The aim is to create a coherent and meaningful dialogue that keeps the user engaged and emotionally connected to the chat session. The generated further synthetic reaction is then presented to the user through the companion client device (300), either as spoken words through the speaker (330) or as text on the display screen (350). The user can continue to react and provide feedback, which can be used to generate additional synthetic reactions, creating an ongoing conversation.

By detecting the user's reaction and using it to generate further synthetic reactions, the system (250) creates a more dynamic and interactive chat session. The user feels heard and acknowledged, as their responses directly influence the flow and content of the conversation. This interactivity enhances the emotional connection between the user and the automated chat agent, making the experience more engaging and supportive.

Optionally, the process is personalized based on learning the user's preferences and emotional states over time, allowing the system (250) to tailor the interactive experience to the individual user and alleviate their media consumption experience.

The personalization process begins with the system (250) collecting and analyzing data about the user's interactions, preferences, and emotional states. This data can be gathered through various means, such as:

1. Explicit feedback: The user can provide direct feedback to the system (250) through the companion client device (300). This feedback can include ratings, comments, or preferences related to the synthetic reactions, the media content, or the overall experience. The user can input their feedback using the microphone (340), user input devices, or the display screen (350) of the companion client device (300).

2. Implicit feedback: The system (250) can also gather implicit feedback by analyzing the user's behavior and engagement patterns. This can include factors such as the user's response times, the frequency and duration of their interactions, their tone of voice, or their facial expressions (if the companion client device (300) is equipped with a camera).

3. Contextual data: The system (250) can collect contextual data about the user's environment, such as the time of day, the user's location, or the presence of other people. This contextual data can provide insights into the user's mood, preferences, or social context, which can influence the personalization of the synthetic reactions.

The collected data is processed and analyzed by the one or more processors (220) using machine learning algorithms or statistical models stored in the one or more storage units (120). These algorithms can identify patterns, correlations, and insights from the data, allowing the system (250) to build a comprehensive understanding of the user's preferences and emotional states.

Based on the learned preferences and emotional states, the system (250) can personalize the prompt templates used to generate the synthetic reactions. The one or more processors (220) can dynamically adjust the language, tone, or style of the prompt templates to align with the user's preferences. For example, if the user tends to respond positively to humorous or lighthearted reactions, the system (250) can prioritize prompt templates that incorporate jokes, puns, or playful language.

Similarly, the system (250) can personalize the responses generated by the generative language model. The one or more processors (220) can fine-tune the generative language model based on the user's preferences and emotional states, allowing it to generate responses that are more relevant, empathetic, and emotionally resonant for the individual user. This fine-tuning can involve adjusting the model's parameters, training it on user-specific data, or incorporating contextual information into the generation process.

The personalization of the prompt templates and responses aims to create a more engaging and emotionally supportive experience for the user. By adapting to the user's preferences and emotional states, the system (250) can provide synthetic reactions that are more relatable, comforting, and enjoyable. This personalization helps alleviate the media consumption experience by making the user feel understood, valued, and emotionally connected to the content and the automated chat agent.

The personalization process may be iterative. As the user continues to interact with the system (250) and consume media content, the system (250) continuously collects new data, updates its understanding of the user's preferences and emotional states, and refines the personalization of the prompt templates and responses. This dynamic adaptation ensures that the user's experience remains relevant, engaging, and emotionally supportive over time.

Optionally, confusion or misunderstanding to the generated synthetic reaction on the part of the user is identified based on their reaction to the generated synthetic reaction. When such confusion or misunderstanding is identified, the system (250) provides clarification or additional information to address the issue within the chat session. The system (250) analyzes the user's reaction to the generated synthetic reaction using various techniques, such as:

1. Sentiment analysis: The system (250) examines the sentiment expressed in the user's response to determine if it indicates confusion or a lack of understanding. Negative sentiment or expressions of uncertainty may suggest confusion.
2. Keyword detection: The system (250) looks for specific keywords or phrases in the user's response that indicate confusion or a need for clarification, such as "I don't understand," "What do you mean," or "Can you explain?"
3. Contextual analysis: The system (250) considers the context of the user's response in relation to the generated synthetic reaction and the overall conversation. If the user's response seems unrelated or inconsistent with the previous interaction, it may indicate confusion or misunderstanding.

When the one or more processors (220) detect confusion or misunderstanding based on these analyses, the system (250) takes action to provide clarification or additional information. This can be done in several ways:

1. Generating a clarifying synthetic reaction: The system (250) can generate a new synthetic reaction specifically designed to clarify the previous point or provide more context. This clarifying reaction may rephrase the information, offer examples, or break down complex concepts into simpler terms.
2. Providing additional resources: The system (250) can present supplementary information or resources to help the user better understand the topic or concept. This can include links to relevant articles, videos, or other media that provide more in-depth explanations or background information.
3. Engaging in a clarifying dialogue: The system (250) can initiate a back-and-forth dialogue with the user to identify the specific point of confusion and provide targeted clarification. The system (250) may ask the user questions to pinpoint the source of confusion and then offer tailored explanations or examples to address the misunderstanding.

By detecting confusion or misunderstanding and providing clarification, the system (250) ensures that the user remains engaged and informed throughout the chat session. It helps prevent frustration or disengagement that may arise from unresolved confusion, enhancing the overall quality and effectiveness of the user's interaction with the automated chat agent and the media consumption experience. The ability to detect and address user confusion in real-time demonstrates the system's (250) adaptability and responsiveness to the user's needs. It showcases the system's (250)

capability to provide personalized support and guidance, making the media consumption experience more accessible, enjoyable, and intellectually stimulating for the user.

Optionally, the generated synthetic reactions which presented during the presentation of the media content created are aggregated in a summary. As indicated above, as the user consumes the media content and interacts with the automated chat agent, the system (250) generates multiple synthetic reactions throughout the duration of the media. Each synthetic reaction corresponds to a specific moment, scene, or cue in the media content and represents a unique point of engagement or emotional response.

The one or more processors (220) store these generated synthetic reactions in the one or more storage units (120), along with relevant metadata such as the timestamp, the associated media content, and the user's feedback (if available). This stored data forms the basis for creating a summary of the chat session.

The summary is generated by the one or more processors (220) by compiling and organizing the stored synthetic reactions in a coherent and meaningful manner. The summary may include the following elements:

1. Highlights: The summary identifies and emphasizes the most significant or impactful synthetic reactions generated during the media consumption. These highlights capture the key moments of engagement, emotional resonance, or user interaction.
2. Chronological order: The summary presents the synthetic reactions in the order they were generated, aligned with the timeline of the media content. This chronological organization helps to provide context and narrative flow to the summary.
3. User feedback: If available, the summary incorporates the user's reactions and feedback to the synthetic reactions. This inclusion of user responses helps to showcase the interactive nature of the chat session and the emotional connection established between the user and the automated chat agent.
4. Metadata: The summary may include additional metadata about each synthetic reaction, such as the associated scene, character, or theme of the media content. This metadata provides further context and helps to create a comprehensive overview of the chat session.

The generated summary serves for allowing the user to reflect on their media consumption experience and relive the key moments of engagement and emotional resonance. It provides a condensed and curated view of the chat session, highlighting the most meaningful interactions and reactions. Another option is to allow sharing the summary with others, such as friends or social media followers, to showcase the user's media consumption experience and the engaging interactions they had with the automated chat agent. This sharing aspect can foster a sense of community and encourage further discussions around the media content. The aggregated content may also be used for personalization of the user's media consumption experience. By analyzing the user's reactions and engagement patterns captured in the summary, the system (250) can refine its understanding of the user's preferences and emotional states, leading to more tailored and relevant synthetic reactions in future chat sessions.

The summary may also serve as a historical record of the user's media consumption and their interactions with the automated chat agent. It can be stored and accessed later, allowing the user to revisit their experiences and track their emotional journey over time.

Optionally, the method described herein is extended to support multiple users simultaneously consuming the same media content. In this scenario, the system (250) repeats the monitoring, assembling, providing, and presenting steps for each user involved in the shared media consumption experience.

Each user interacts with the system (250) through their own companion client device (300). The one or more processors (220) allocate separate instances for each user, allowing for personalized and independent interactions. During the presentation of the media content, the system (250) monitors the media content and detects predefined cues or triggers for generating synthetic reactions. These cues may be common across all users, ensuring a synchronized experience. When a cue is detected, the system (250) assembles a prompt for each user by combining the predefined prompt template with the extracted content from the media segment. The assembled prompts are then provided to the generative language model to generate synthetic reactions for each user.

The generated synthetic reactions are presented to each user through their respective companion client devices (300). Each user can interact with their own synthetic reaction, provide feedback, and engage in a personalized chat session with the automated chat agent.

The above allows the system (250) to create a shared media consumption experience that still allows for individual engagement and interaction. Users can discuss the media content with each other while also receiving personalized synthetic reactions and engaging in separate chat sessions with the automated chat agent.

This multi-user functionality enhances the social aspect of media consumption, allowing users to enjoy the content together while still receiving individualized support and engagement from the system (250).

Optionally, reactions from multiple users to the generated synthetic reaction are detected and used to generate a further synthetic reaction that promotes a multi-participant session. After presenting the initial synthetic reaction to each user, the system (250) monitors and captures the reactions and feedback from all the users involved in the shared media consumption experience. Each user's reaction is detected through their respective companion client device (300) using the microphone (340) or other input methods.

The captured reactions from all users are then processed by the one or more processors (220) to extract relevant information, such as the sentiment, emotion, or intent expressed in each reaction. This processing helps to understand the collective response of the users to the generated synthetic reaction. The extracted information from all user reactions is then inputted into another generative language model specifically trained to generate synthetic reactions that foster multi-participant engagement. This generative model takes into account the diverse perspectives, emotions, and intents expressed by the users and aims to create a synthetic reaction that encourages further discussion and interaction among the participants.

The generated multi-participant synthetic reaction is then presented to all or some users through their respective companion client devices (300). This synthetic reaction serves as a common talking point or prompt for the users to engage in a group discussion or shared experience.

For example, the multi-participant synthetic reaction could pose a thought-provoking question related to the media content, highlight a contrasting viewpoint expressed by one of the users, or suggest an activity or topic for the group to explore further. The aim is to stimulate conversations, debates, and collaborative exploration among the users.

By detecting reactions from multiple users and generating a synthetic reaction that promotes multi-participant engagement, the system (250) facilitates a shared and interactive media consumption experience. Users can not only engage with the automated chat agent but also with each other, fostering a sense of community and social connection.

This multi-participant functionality enhances the emotional and social support provided by the system (250), allowing users to share their thoughts, opinions, and emotions with others who are consuming the same media content. It creates opportunities for users to learn from each other, build relationships, and enjoy a more socially engaging media consumption experience.

Reference is now made to a number of examples.

Example 1: Generating a Synthetic Reaction for a TV Show Episode

The system (250) may be utilized to enhance the media consumption experience of a user watching an episode of the TV show "Friends."

The one or more processors (220) may monitor the media content in real-time or in advance, analyzing the audio, visual, and textual data to detect predefined cues. For example, scripts may be analyzed as described above. In this example, the system (250) detects a cue in the form of a dialogue scene between the characters "Monica" and "Rachel". The one or more processors (220) extract the relevant dialogue content from the scene and assemble a prompt by combining it with a predefined prompt template. The assembled prompt is then provided to the generative language model stored in the one or more storage units (120).

The generative language model processes the prompt and generates a synthetic reaction in the form of a humorous remark that Monica could say to Rachel in response to the scene. The generated synthetic reaction is for example: "Well, lucky for you, I make a mean cup of de-caff and have a sofa with your name on it. Let's start with tonight and figure out the rest tomorrow."

The one or more processors (220) then instruct the companion client device (300) to present the generated synthetic reaction to the user. The synthetic reaction is converted into an audio format using a text-to-speech engine and played through the speaker (330) of the companion client device (300). The audio output mimics the voice and intonation of the character Monica, creating an immersive and engaging experience for the user.

By generating contextually relevant and humorous synthetic reactions, the system (250) enhances the user's enjoyment of the TV show episode and provides a sense of companionship during the media consumption experience.

Example 2: Generating a Synthetic Reaction Highlighting Key Moments

In this example, the system (250) is used to generate a synthetic reaction that highlights a key moment from the first scene of an episode of the TV show "Friends." The one or more processors (220) analyze the media content and detect a significant dialogue exchange between the characters Chandler and Monica, for instance as described above.

The detected dialogue is as follows: Chandler: "Sounds like a date to me." Monica: [Chandler describes a bizarre dream he had about being naked at school and finding a phone instead of private parts, only to receive a call from his mother.]

The one or more processors (220) extract this dialogue and provide it as input to the generative language model. The generative language model processes the input and generates a synthetic reaction in the form of a "Do you remember when . . . " statement, highlighting the humorous and memorable nature of the scene.

The generated synthetic reaction is: "Do you remember when Chandler said, 'Sounds like a date to me,' and then went on to describe his bizarre dream?"

The one or more processors (220) then instruct the companion client device (300) to present the generated synthetic reaction to the user through the speaker (330) or display screen (350). The user can engage with the synthetic reaction, possibly triggering further discussion or reminiscence about the highlighted scene.

By generating synthetic reactions that highlight key moments from the media content, the system (250) helps users recall and reflect on memorable or impactful scenes, enhancing their overall media consumption experience.

Example 3: Generating a Synthetic Reaction Based on User Reactions

In this example, multiple users are consuming the same episode of the TV show "Friends" simultaneously. The system (250) monitors the media content and generates synthetic reactions for each user based on their individual reactions and engagement.

The one or more processors (220) detect a specific scene in the episode that elicits strong reactions from the users. The scene involves a humorous moment where the character Chandler makes a sarcastic comment about Monica's dating life.

The system (250) captures the reactions of each user through their respective companion client devices (300). Some users laugh at Chandler's comment, while others express sympathy for Monica's situation. The one or more processors (220) analyze these reactions and extract relevant information, such as the sentiment and emotion expressed by each user. The extracted information is then inputted into a generative language model specifically trained to generate synthetic reactions that promote multi-participant engagement. The generative model processes the diverse user reactions and generates a synthetic reaction that encourages further discussion and interaction among the users.

The generated multi-participant synthetic reaction could be a question like, "What do you think about Chandler's comment? Was it justified or too harsh on Monica?" This question prompts the users to share their opinions and engage in a discussion about the scene and the characters' behaviors.

The system (250) presents the multi-participant synthetic reaction to one or more of the users through their companion client devices (300). Users can then respond to the prompt, sharing their thoughts and opinions with each other. The system (250) may facilitate this multi-participant conversation by monitoring user responses, generating further synthetic reactions, and keeping the discussion on track.

By generating synthetic reactions based on user reactions and promoting multi-participant engagement, the system (250) creates a shared and interactive media consumption experience. Users can discuss the TV show episode with each other, exchange perspectives, and build social connections while still receiving personalized support and engagement from the automated chat agent.

These examples demonstrate how the system (250) may be applied to enhance the media consumption experience of one or more users watching a TV show episode. By generating contextually relevant, humorous, and engaging synthetic reactions, highlighting key moments, and facilitating multi-participant discussions, the system (250) provides a more immersive, enjoyable, and socially connected media consumption experience.

While the primary focus of the present invention is on enhancing the media consumption experience in the entertainment domain, the system's capabilities may be extended to various other fields Education: The above described generative AI-powered interactive companion may be adapted to support educational contexts, providing personalized learning experiences and fostering student engagement. In an educational setting, the system may be integrated with educational videos, online courses, or interactive learning materials. As students consume the educational content, the AI companion may generate contextually relevant questions, prompts, or explanations to reinforce learning and encourage critical thinking.

For example, during a science video lesson, the AI companion may generate thought-provoking questions related to the concepts being taught, stimulating students to reflect on their understanding and apply their knowledge. The companion may also provide additional examples, analogies, or real-world applications to clarify complex ideas and make the learning experience more engaging and memorable.

Moreover, the AI companion may adapt its responses based on the student's individual learning style, pace, and performance. By analyzing the student's interactions, the companion may identify areas where the student may need more support or challenge and adjust its reactions accordingly. This personalized approach may help students stay motivated, overcome learning barriers, and achieve better educational outcomes.

Therapy: The above described emotionally engaging and contextually relevant companion may be leveraged in therapeutic contexts to support mental health and well-being. In a therapy setting, the AI companion may be integrated with therapeutic videos, guided meditations, or self-help content. As individuals engage with the therapeutic material, the AI companion may generate empathetic responses, reflective questions, or supportive statements to facilitate emotional processing and self-awareness.

For instance, during a video on coping with anxiety, the AI companion may generate prompts that encourage the individual to reflect on their own experiences, share their thoughts and feelings, and explore coping strategies. The companion may provide validation, normalize the individual's experiences, and offer evidence-based techniques for managing anxiety symptoms.

The AI companion's responses may be tailored to the individual's specific needs, taking into account their emotional state, personal history, and therapeutic goals. By establishing a supportive and non-judgmental conversational space, the companion may help individuals feel heard, understood, and empowered in their therapeutic journey. The invention's application in therapy may complement traditional therapeutic interventions, making mental health support more accessible and personalized.

Social Networking: The above described interactive companion may be integrated into social networking platforms to enhance user engagement and foster meaningful connections. In a social networking context, the AI companion may facilitate discussions, moderate conversations, and provide personalized recommendations based on user interests and interactions.

For example, in a virtual book club hosted on a social networking platform, the AI companion may generate discussion prompts, highlight thought-provoking passages, and encourage users to share their interpretations and opinions. The companion may also provide background information on the book's themes, historical context, or author, enriching the overall discussion experience.

Furthermore, the AI companion may analyze user interactions and preferences to suggest relevant content, groups, or connections within the social networking platform. By understanding each user's unique interests and communication styles, the companion may facilitate the formation of sub-communities and help users discover like-minded individuals for meaningful interactions.

The invention's application in social networking may promote a more engaging, inclusive, and supportive online environment, where users feel encouraged to express themselves, learn from diverse perspectives, and build genuine connections with others who share their passions.

It is expected that during the life of a patent maturing from this application many relevant systems and methods will be developed and the scope of the term content analysis, sensors and processing units is intended to include all such new technologies a priori.

As used herein the term "about" refers to +10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for enhancing media consumption experience, comprising:
   monitoring media content presented to a user in real-time to detect at least one predefined cue in a segment of the media content;
   in response to a detection of the at least one predefined cue, extracting relevant information from the segment of the media content containing the detected cue;
   assembling a prompt by combining a prompt template predefined for the detected cue with the extracted content from the media segment;
   providing the assembled prompt to a generative language model to generate a synthetic reaction to the extracted content, wherein the generative language model is trained to provide contextually appropriate and emotionally engaging responses; and
   presenting the generated synthetic reaction to the user in an interface facilitating a chat session between the user and at least one automated chat agent during the presentation of the media content;
   repeating the monitoring, the assembling, the providing, and the presenting for each of a plurality of different users during the presentation of the media content:
   detecting a plurality of reactions from a plurality of different users to the generated synthetic reaction;
   inputting the plurality of reactions to another generative language model to generate a further synthetic reaction; and presenting the further synthetic reaction to the plurality of reactions in the interface as part of the chat session, thereby promoting a multi participant session.

2. The method of claim 1, further comprising repeating the monitoring, the assembling, the providing, and the presenting for the duration of the media content, thereby providing an interactive and emotionally supportive experience for the user throughout a consumption of the media content.

3. The method of claim 1, further comprising personalizing at least one of the prompt template and responses of the generative language model based on at least one of one or more learned preferences and one or more emotional states of the user to alleviate a media consumption experience.

4. The method of claim 1, wherein the monitoring the media content comprises analyzing textual content of the media content.

5. The method of claim 1, wherein the generative language model is trained using data including at least one of reviews, comments, and forum discussions about a plurality of media content items.

6. The method of claim 1, further comprising:
   detecting a reaction of the user to the generated synthetic reaction;
   inputting the reaction to another generative language model to generate a further synthetic reaction; and
   presenting the further synthetic reaction to the user in the interface as part of the chat session.

7. The method of claim 1, further comprising adding the generated synthetic reaction to a summary summarizing a plurality of generated synthetic reactions created during the presentation of the media content.

8. The method of claim 1, further comprising: detecting a user engagement level with the chat session; adjusting a frequency of the presenting the generated synthetic reactions based on the detected user engagement level, wherein the frequency is increased when the user engagement level is high and decreased when the user engagement level is low.

9. The method of claim 1, wherein the at least one predefined cue is determined based on a script, transcript, or similar description of the contents of the media content.

10. The method of claim 1, wherein the generative language model is further trained using reviews, comments, or forum discussions related to the media content.

11. The method of claim 1, wherein the chat session includes interactions with other users consuming the same media content, and the generated synthetic reactions consider the discussions with these other users.

12. The method of claim 1, wherein the presenting of the generated synthetic reaction is performed using a voice that emulates a character from the media content.

13. The method of claim 1, further comprising: determining a physical or mental state of the user; and adjusting the timing or content of the generated synthetic reactions based on the determined physical or mental state.

14. The method of claim 1, wherein the monitoring the media content further comprises analyzing visual cues in the media content, including at least one of facial expressions, scene changes and transitions, visual objects and symbols, character movements and actions, or visual aesthetics and style.

15. The method of claim 1, further comprising: determining an objective for the chat session, wherein the objective is related to at least one of reducing user loneliness, assessing a mental state of the user, or educating the user; and generating the synthetic reactions in accordance with the determined objective.

16. A system for enhancing media consumption experience and alleviating user loneliness, comprising:
    one or more storage units for storing a code and a generative language model;
    one or more processors adapted to execute the code to:
    monitor media content presented in real-time and detect at least one predefined cue in a segment of the media content;
    in response to a detection of the at least one predefined cue, extract relevant information from the segment of the media content containing the detected cue;
    assemble a prompt by combining a prompt template predefined for the detected cue with the extracted content from the media segment;
    provide the assembled prompt to the generative language model to generate a synthetic reaction to the extracted content, wherein the generative language model is trained to provide contextually appropriate and emotionally engaging responses; and
    instruct a presentation of the generated synthetic reaction to the user in an interface facilitating a chat session between the user and at least one automated chat agent during the presentation of the media content;
    detecting a confusion or a misunderstanding of the user based on the user's reaction to the generated synthetic reaction; providing clarification or additional information to address the confusion or the misunderstanding in the chat session.

17. The system of claim 16, wherein the one or more processors are further adapted to execute the code to: analyze audio content of the media content to detect the at least one predefined cue, wherein the at least one predefined cue includes at least one of a tone, a pitch, an intensity, or an emotion in the audio content.

18. The system of claim 16, wherein the one or more processors are further adapted to execute the code to: generate a summary of the chat session, the summary including key points, interesting reactions, or decisions made during the chat session; store the summary for future reference or sharing with others.

19. The system of claim 16, wherein the one or more processors are further adapted to execute the code to: identify a product, a service, or a topic relevant to the media content; generate a recommendation or an advertisement related to the identified product, service, or topic; present the recommendation or the advertisement to the user during the chat session at an appropriate time based on the context of the media content and the chat session.

20. The system of claim 16, wherein the one or more processors are further adapted to execute the code to: determine a point in the media content associated with a specific event or scene; and select the prompt template based on the determined point in the media content.

21. The system of claim 16, wherein the one or more processors are further adapted to execute the code to: receive a user response to the generated synthetic reaction; provide the user response as input to the generative language model to generate a follow-up synthetic reaction; and present the follow-up synthetic reaction to the user in the chat session.

22. A method for enhancing media consumption experience, comprising:
    identifying media content currently presented to a user;
    in response to a detection of at least one predefined cue in content of a segment of the media content, selecting one of a plurality of prompt templates predefined for the at least one predefined cue;
    providing a prompt assembled from the selected prompt template and content extracted from the segment of the media content to a generative language model to induce a synthetic reaction to the content extracted from the segment; and
    presenting the synthetic reaction in a chat session held between the user and at least one automated chat agent about the media content during a presentation of the media content;
    detecting a confusion or a misunderstanding of the user based on the user's reaction to the generated synthetic reaction; providing clarification or additional information to address the confusion or the misunderstanding in the chat session.

* * * * *